United States Patent [19]

Fling et al.

[11] 3,793,884
[45] Feb. 26, 1974

[54] LIQUID LEVEL MEASURING DEVICE

[76] Inventors: Thomas A. Fling, 155 Jackson, No. 905, San Francisco, Calif. 94111;
William F. Fling, 351 S. Fuller Ave., Los Angeles, Calif. 90036

[22] Filed: Dec. 27, 1972

[21] Appl. No.: 318,744

[52] U.S. Cl. .................................. 73/315, 73/314
[51] Int. Cl. ............................................ G01f 23/06
[58] Field of Search ............ 73/314, 315; 33/126.5; 43/44.85, 44.88; 24/132 AB, 249 SA, 243 Q

[56] References Cited
UNITED STATES PATENTS
3,638,492  2/1972  Fling et al. ............................ 73/315
1,179,471  4/1916  Tanner .................................. 73/314
2,996,321  8/1961  Harris ............................ 24/249 SA
1,913,023  6/1933  Farrell ................................. 73/315

*Primary Examiner*—Richard C. Queisser
*Assistant Examiner*—Daniel M. Yasich

[57] ABSTRACT

A liquid level measuring device is provided with a frame. A float member within the frame and a gripper member partially within the float member both surround a guide. Contact edges of the gripper member engage the guide. Means connected to the guide selectively disengage the gripper member from the guide.

2 Claims, 7 Drawing Figures

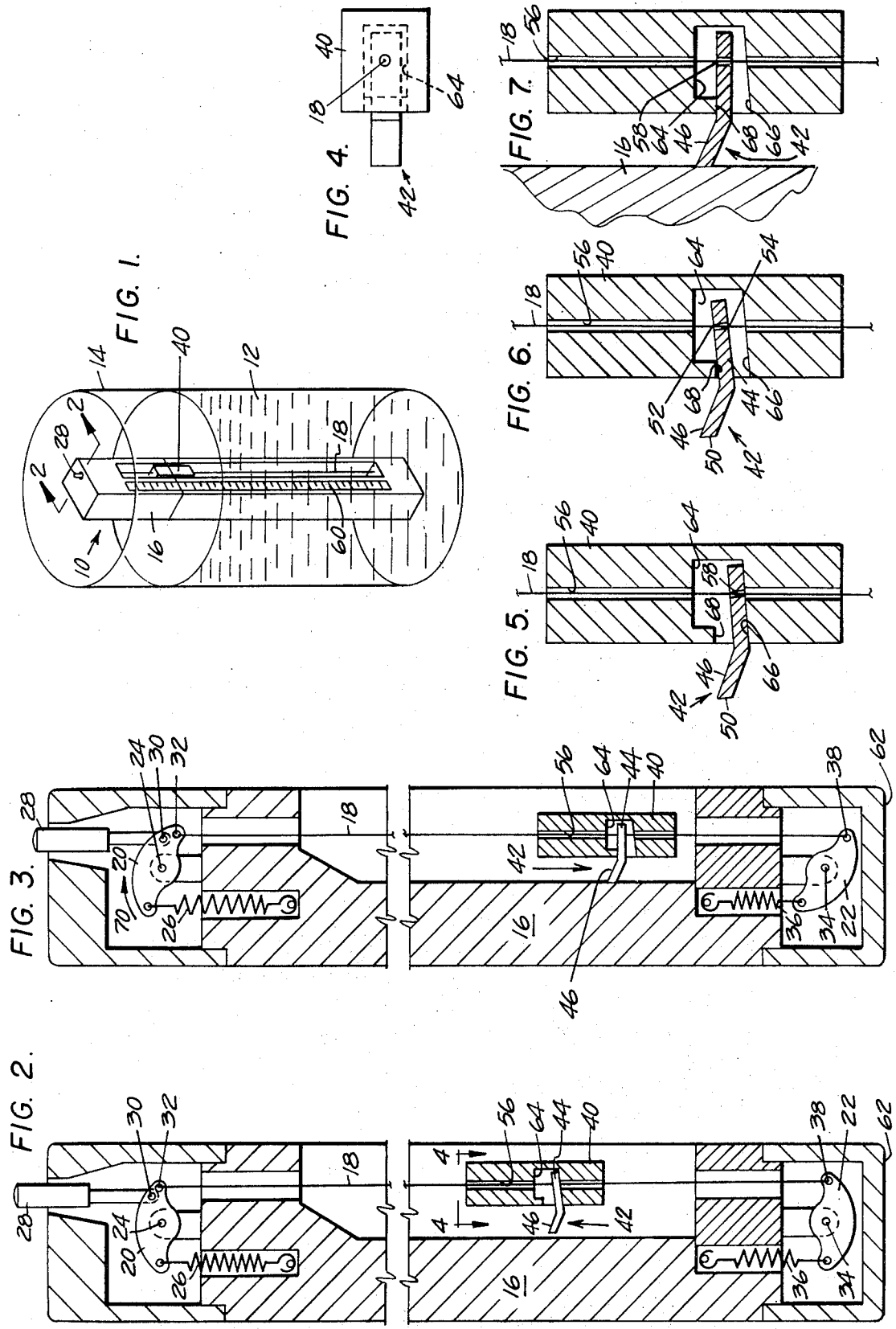

ived into a liquid containers 14.

LIQUID LEVEL MEASURING DEVICE

BACKGROUND OF THE INVENTION

A liquid level measuring device is provided with a frame, a guide, and a float member surrounding the guide having a gripper member partially therein to measure the exact level of the liquid within the container.

SUMMARY OF THE INVENTION

The obtaining of rapid and accurate measurements of liquids contained within vessels has been an industrial headache for a long time. The types of measuring devices on the market at the present time all have drawbacks of one sort or another. Measuring devices using the wetted line principle produce an accurate reading but cannot be reused until the measured liquid has dried from the measuring surface. The reel type of device is not in great demand because the winding up of the reel can be and often is quite cumbersome and time consuming. Many different float-type devices have been used in the past but the main problem with these devices is that they result in only a reasonably accurate reading, not an exact reading of the level of the liquid. While our previous patent, U.S. Pat. No. 3,638,492, resulted in an exact reading of the liquid level, the engineering details provided some difficulty in manufacture.

Applicants have overcome the above-described problems by providing an easily constructed float-type measuring device which produces an exact reading of the liquid level.

It is the primary object of the present invention to provide a new and improved liquid level measuring device.

Another object is to provide a liquid level measuring device which gives an exact reading of the liquid level.

A further object of the invention is to provide structure of the character described which is economical to produce and long lasting in usage.

BRIEF DESCRIPTION OF THE DRAWINGS

FIG. 1 is a perspective view illustrating the liquid level measuring device of the present invention placed within a container.

FIG. 2 is a view taken substantially as indicated along line 2—2 of FIG. 1 and showing the gripper member in normal operation.

FIG. 3 is a view similar to FIG. 2 but showing the gripper member disengaged from the guide.

FIG. 4 is a view taken substantially as indicated along line 4—4 of FIG. 2.

FIG. 5 is an enlarged view of the buoyant float illustrating the position of the gripper member (in section) when the float is rising in the liquid.

FIG. 6 is an enlarged view of the buoyant float illustrating how the gripper member (in section) engages the guide.

FIG. 7 is an enlarged view of the buoyant float illustrating the position of the gripper member disengaged from the guide.

DESCRIPTION OF THE PREFERRED EMBODIMENT

Referring to FIG. 1 of the drawing, there is shown the liquid level measuring device of this invention, generally indicated 10, which is adaptable for use with many different liquids 12 and many different containers 14.

Looking particularly at FIGS. 2 and 3, there is shown a frame 16 having a guide 18 thereon which is intermediate upper member 20 and lower member 22. Upper member 20 is pivoted to frame 16 at 24 and is biased in an upward position by means of spring 26. Activating handle 28 extends above the top of the frame 16 and is secured to upper member 20 at 30 near aperture 32 through which guide 18 passes. Lower member 22 is pivoted to frame 16 at 34 and is maintained in a neutral position by spring 36. Guide 18 is connected to lower member 22 by means of aperture 38.

Buoyant float 40 surrounds guide 18. Gripper member, generally indicated 42, is cooperatively associated with float 40 and also surrounds guide 18. The gripper member 42 is partially within the float 40 and has a straight portion 44, an angled portion 46, a bottom surface, a release surface 50, an upper contact edge 52, and a lower contact edge 54. Aperture 56 extending longitudinally through float 40 and aperture 58 extending through gripper member 42 allow both the float 40 and gripper 42 to move along the guide when the contact edges 52 and 54 are not in the engaged position. Scale member 60 on frame 16 is calibrated to the geometry of the particular container 14 to give the desired reading. As will be described in detail hereinafter, the gripper member 42 engages the guide 18 to give an exact reading of the liquid level when the device 10 is removed from the liquid 12.

In actual operation, the liquid level measuring device of this invention is lowered into a liquid containing vessel until the lower end 62 of the frame 16 rests upon the bottom of the vessel or container 14. The float 40 will rise to the level of the liquid 12 within the container 14 but remain partially submerged due to its own weight. The gripper member 42 secures the float 40 in any position that the float 40 comes to rest.

Without the float 40, the gripper member 42 would retain any position to which it is raised due to the friction forces between the contact edges 52 and 54 and the guide 18. These forces are developed by the weight of the gripper 42 attempting to rotate the gripper 42 about the guide 18 since the aperture 58 is off center relative to the length of the gripper member 42. Thus, the weight of the gripper is applied by the contact edges 52 and 54 against the guide 18. This large friction force causes the gripper 42 to remain fixed relative to the guide 18 as long as the weight is permitted to act on the contact edges 52 and 54 and guide 18. When installed in slot 64 of the float 40, the gripper 42 rises with the float 40 because the buoyant force of the float 40 overcomes the weight of the gripper by contact with sloped surface 66 within slot 64 as shown in FIG. 5.

When the frame 16 is lifted from the liquid 12, the gripper member 42 remains at its position since the buoyant lifting force of the float 40 is removed and the weight of the gripper member 40 acts through contact edges 52 and 54 to secure it against the guide 18. These contact forces are increased by the weight of the float 40 which is transferred to the gripper member 42 by depending portion 68 as illustrated in FIG. 6.

The release mechanism or disengaging means of the present invention maintains the guide 18 taut between upper member 20 and lower member 22 during measuring and also causes guide 18 and float 40 to move downward and inward toward frame 16 when activated. The disengaging means is activated by depressing activating handle 28. This causes spring 26 to elongate and permits upper member 20 to pivot or rotate clockwise as indicated by arrow 70 (FIG. 3). Clockwise movement causes the float 40 and guide 18 to move downward and inward toward frame 16 until release surface 50 is flush with the frame 16 causing the gripper member 42 to rotate clockwise until it is flush with depending member 68 so that the straight portion 44 of the gripper member 42 is substantially perpendicular to guide 18 thereby moving the contact edges 52 and 54 away from guide 18 and causing the float 40 to descend to the bottom of the measuring device. When activating handle 28 is depressed, lower member 22 also rotates clockwise and spring 36 keeps guide 18 taut. Upon release of activating handle 28, spring 26, which is stronger than spring 36, brings all members back into measuring position as shown in FIG. 2.

Thus, it can be seen that means are provided which are connected to the guide 18 for selectively disengaging the gripper member 42 from the guide 18. In addition, the operation of the gripper member 42 on guide 18 is such that neither movement nor an external mechanism is required to secure the float 40 in the position which measures the exact level of the liquid.

We claim:

1. A liquid level measuring device for a container, comprising:
   a. a frame insertable in liquid in said container;
   b. a guide cable in said frame;
   c. a buoyant float passing through and surrounding said guide cable;
   d. a gripper member having an aperture through which said guide cable passes, said guide cable movably associated with said buoyant float, the ends of said aperture having upper and lower contact edges on opposite surfaces of the gripper member, said gripper member rising with said float during upward motion of said float relative to said guide cable;
   e. said contact edges engaging said guide cable when the weight of said gripper member is allowed to act on said guide cable when said float is out of contact with said liquid; and
   f. means in the frame connected to said guide cable and cooperating with said float for selectively disengaging said gripper member from said guide cable when said gripper member contacts said frame.

2. A liquid level measuring device for a container, comprising:
   a. a frame insertable in liquid in the container;
   b. a flexible guide means in said frame;
   c. a buoyant float passing through and surrounding said guide means;
   d. a gripper member selectively movable through the guide means and positioned partially within said buoyant float and surrounding said guide means, said gripper member having a straight portion with an aperture and an angled portion and adapted to move along the guide during upward motion of said float in the liquid relative to said guide means, the edges of said aperture gripping the guide means upon downward movement of said float; and
   e. disengaging means connected to said guide means for selectively disengaging said gripper member from said guide means by moving said guide means downward and inward toward said frame until the angled portion said gripper member contacts said frame and the straight portion of the gripper is substantially perpendicular to the guide means thereby disengaging said gripper member and said float from said guide means.

* * * * *